United States Patent Office 3,661,891 Patented May 9, 1972

1

3,661,891

ERYTHROMYCIN UREIDES AND PROCESS OF PREPARATION

Anthony A. Sinkula, Kalamazoo, Mich., assignor to The Upjohn Company, Kalamazoo, Mich.

No Drawing. Filed Aug. 28, 1970, Ser. No. 67,964
Int. Cl. C07c *47/18*
U.S. Cl. 260—210 E 6 Claims

ABSTRACT OF THE DISCLOSURE

Erythromycin ureides having the following formula:

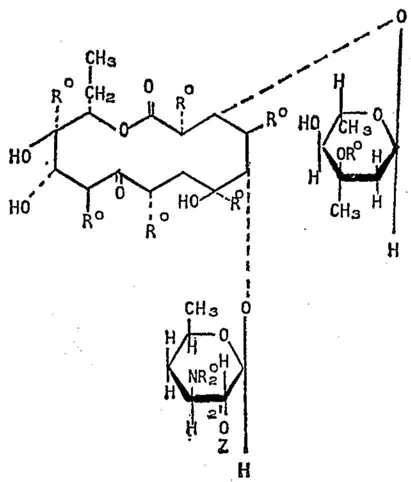

wherein

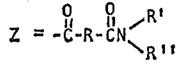

$R^0=CH_3$

R=the radical obtained by the removal of the two carboxyl groups from a dicarboxylic acid which can be dehydrated to an inner anhydride.

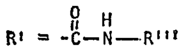

R″ and R‴=H, alkyl of from 1 to 20 carbon atoms, inclusive, and isomeric forms thereof, cycloalkyl of 3 to 8 carbon atoms, inclusive, and aralkyl of not more than 12 carbon atoms.

Erythromycin ureides are superior tasting erythromycin compounds possessing erythromycin antibacterial activities and the same uses as erythromycin. They also demonstrate a depot effect.

BRIEF SUMMARY OF THE INVENTION

This invention relates to novel derivatives of the antibiotic erythromycin A and to processes for the preparation thereof, and is particularly directed to erythromycin A ureides, and to processes for producing them.

Erythromycin is a well known antibiotic produced by the organism *Streptomyces erythreus* as described in U.S. Patent 2,653,899. In the original erythromycin fermentations, as described in U.S. 2,653,899, there was produced several closely related antibiotic materials which were designated erythromycin A, erythromycin B, and erythromycin C. Erythromycin A is distinguishable from erythromycin B and C by having a higher degree of activity against susceptible bacteria. Thus, erythromycin A is preferred when the use of an erythromycin antibiotic is indicated. U.S. Patents 2,823,203 and 2,833,696 disclose processes for the preparation of erythromycin A.

The novel compounds of the invention can be shown as follows:

2

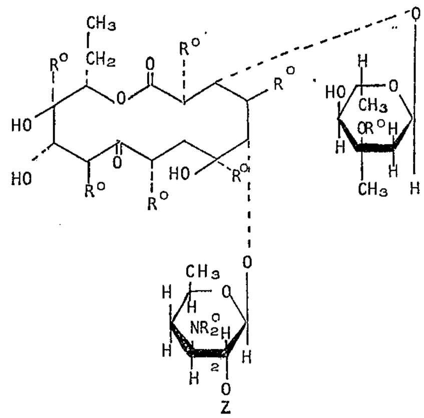

wherein

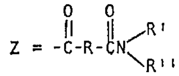

$R^0=CH_3$

R=the radical obtained by the removal of the two carboxyl groups from a dicarboxylic acid which can be dehydrated to an inner anhydride.

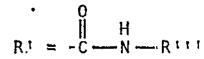

R″ and R‴=H, alkyl of from 1 to 20 carbon atoms, inclusive, and isomeric forms thereof, cycloalkyl of 3 to 8 carbon atoms, inclusive, and aralkyl of not more than 12 carbon atoms.

The compounds can be prepared by first converting erythromycin A to a hemiester, and then reacting this compound with a substituted diimide to form erythromycin A ureides.

The erythromycin ureides of the subject invention possess a less bitter taste than erythomycin A while retaining the antibacteria activity of erythromycin A. Thus, the novel erythromcin A ureides are useful in pediatric formulations.

DETAILED DESCRIPTION

The first step of the process to make the novel compounds of the invention reacting erythromycin A with an anhydride of a dibasic carboxylic acid (also referred to as a "dicarboxylic inner anhydride") to produce an erythromycin A-2′-hemiester. The reaction can be shown as follows:

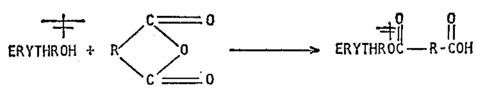

wherein R is the radical obtained by the removal of the two carboxyl groups from a dicarboxylic acid which can be dehydrated to an inner anhydride. Suitable acids are succinic acid, glutaric acid, maleic acid, phthalic acid, adipic acid, and the like. While these simple and more readily available dicarboxylic inner anhydrides will ordinarily be used in the reaction to make an erythromycin hemiester, it is to be understood that more complicated anhydrides, as disclosed in U.S. Pat. 2,957,864, can be used.

The esterification step of the subject invention, disclosed above, can be carried out in accordance with established procedure as disclosed in U.S. Pats. 2,857,312 and 2,957,864. This esterification of erythromycin A replaces the hydroxyl group of the desosamine moiety.

The second step to make erythromycin A ureides is to react the erythromycin A hemister, prepared as disclosed above, with a substituted diimide, for example, dicyclohexylcarbodiimide (DCC). The reaction is carried out in an inert anhydrous solvent that will solubilize the reactants (erythromycin A hemiester and the substituted diimide). The term "inert" is used herein in accordance with the second definition of "solvent" in Hackh's Chemical Dictionary, third edition, to mean "a liquid which dissolves another substance without any change in chemical composition," in contradiction to those types of solvents which dissolve by a chemical reaction. Suitable solvents include acetone, ether, chloroform, methylene chloride, acetonitrile and tetrahydrofuran, dimethyl sulfoxide, dioxane, or combinations thereof.

The reaction is run, advantageously, at room temperature (26° C.) to minimize side reactions. However, the reaction can be run within a temperature range of 10° to 60° C.

The reaction is generally complete in about 48–72 hours when it is run at room temperature. Obviously, higher temperature will shorten the reaction time. Also, the reaction time can be reduced by the occasional addition of excess amounts of substituted diimide.

Substituted diimides which can be used in the reaction are $$R{-}N{=}C{=}N{-}R'$$

wherein R and R' are hydrogen, alkyl of from 1 to 20 carbons atoms, inclusive, and isomeric forms thereof, cycloalkyl of from 3 to 8 carbon atoms, inclusive, and aralkyl of not more than 12 carbon atoms.

Examples of alkyl of from 1 to 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl, and the isomeric forms thereof. Examples of cycloalkyl are cyclopropyl, cyclobutyl, cyclopentyl, cyclohexyl, cyclohexylmethyl, cycloheptyl, cyclooctyl, 2-methylcyclopentyl, 2,3 - dimethylcyclobutyl, 4 - methylcyclobutyl, 3-cyclopentylpropyl, and the like. Examples of aralkyl are benzyl, phenethyl, α-phenylpropyl, α-naphthylmethyl, and the like.

Erythromycin ureides by virtue of their basic amino groups form addition salts with both organic and inorganic acids. These salts can be prepared from the erythromycin ureide free base by methods conventionally employed for the preparation of acid addition salts of basic antibiotics. For example, the free base can be neutralized with the appropriate acid to below about pH 7.5, and advantageously to about pH 2 to pH 6. Salts which can be made are as follows: (1) alkyl carboxylate salts, $$X\overset{\overset{O}{\|}}{C}O^{\ominus}$$

where X=$C_1$ to $C_{17}$; (2) alkyl sulfate salts, $$XSO_3^{\ominus}$$

where X=$C_1$ to $C_{18}$, for example, laurylsulfate; (3) aromatic carboxylate salts; for example, benzoate, salicylate, o-benzoate, 5,5'-methylene-bis-salicylate, and 5-phenylsalicylate; (4) aliphatic dicarboxylate salts, for example (malonate, succinate, α,β-dibromosuccinate, tartrate, maleate, sebacate, adipate, and malate; (5) inorganic acid salts, for example, hydrochloride, sulfate, phosphate, and hydrobromide; and (6) other acid addition salts, for example, glutamate, glucoheptanoate, gluconate, lactobionate, citrate, mandelate, phenylbutyrate, α-ethyl-γ-phenylbutyrate, α-benzamido-β-benzylmercaptobutyrate N-(4'-nitrobenzoyl) glutamate, 4-phenylbenzylate, cyclohexanepropionate, α-(4-xenyl) phenylacetate, fencholate, monobenzyl succinate, 4-phenyl benzoate, 4(4'-phenylazo) benzoate, 2,4,6-trimethylbenzoate, 4(4'-tosylamido) benzoate, 2,6-dimethyl-4-carbamylbenzoate, 2,6 - dimethyl - 4-acetamidobenzoate, 2,3,5,6-tetramethylbenzoate, α-naphthoate, monobutylphthalate, 4-(4' - nitrophenyl)benzoate, 4 - cyclohexyloxybenzoate, veratrate, naphthalate, isophthalate, benzophenone-2,4-dicarboxylate mono-salt, benzophenone-2,4-dicarboxylate di-salt, 1,1'-binaphthalene-8,8'-dicarboxylate mono-salt and di-salt, β-resorcylate, gentisate, 5-bromosalicylate, 4-aminosalicylate, 3-phenylsalicylate, 4-phenylsalicylate, 4-phenylgentisate, 5-nitro-3-phenylsalicylate, pamoate, syringate, vanillate, thiosalicylate, cinnamate, α-benzamido cinnamate, 4 - nitrocinnamate, 3,4 - methylenedioxycinnamate, 2-methoxycinnamate, α-ethylcinnamate, tannate, 3-indoleacetate, and 2-indolecarboxylate.

Salts of erythromycin ureides can be used for the same biological purposes as the free base.

The following illustrate the use in formulations of the compositions of the present invention. All percentages are by weight and all solvent mixture proportions are by volume unless otherwise noted.

The compositions of the present invention are preferably presented for administration to humans and animals in unit dosage forms, such as tablets coated and uncoated, capsules hard and soft, powders, granules, sterile parenteral solutions or suspensions, and oral solutions or suspensions, containing suitable quantities of erythromycin ureide or its pharmacologically acceptable salts.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, starch, lactose, acacia, methylcellulose, and functionally similar materials as pharmaceutical diluents or carriers. The tablets can be coated or left uncoated. Suitable coatings include a sealing coat of shellac, a taste-disguising carbohydrate coating (such as sugar or methylcellulose), and a lipid polish coating such as carnauba wax. Special coatings can comprise (a) lipid-type coatings of a semi-permeable nature for delaying absorption of the active ingredient to provide sustained action or (b) enteric substances, such as styrene-maleic acid copolymer and cellulose acetate phthalate, to resist release of the active ingredient in the stomach and permit release in the upper intestine. In their simplest embodiment, capsules, like tablets, are prepared by mixing the antibiotic with an inert pharmaceutical diluent and filling the mixture into a hard gelatin capsule of appropriate size. Soft gelatin capsules are prepared by machine encapsulation of a slurry of the antibiotic with corn oil, light liquid petrolatum or other inert oil.

Fluid unit dosage forms for oral administration such as emulsions, syrups, elixirs, and suspensions can be prepared. Emulsions can be oil-in-water or water-in-oil type and contain the active ingredient in the required amount with acceptable emulsifying agents, such as gum acacia, gum tragacanth, and the like. The water-soluble forms can be dissolved in an aqueous vehicle together with sugar, aromatic flavoring agents and preservatives to form a syrup. An elixir is prepared by using a hydroalcoholic (ethanol) vehicle with suitable sweeteners such as sugar, saccharin, and cyclamate together with an aromatic flavoring agent. Suspensions can be prepared of the insoluble forms with a syrup vehicle with the aid of a suspending agent such as acacia, tragacanth, methylcellulose and the like.

Topical ointments can be prepared by dispersing the antibiotic in a suitable ointment base such as petrolatum, lanolin, polyethylene glycols, mixtures thereof, and the like. Advantageously, the antibiotic is finely divided by means of a colloid mill utilizing light petrolatum as a levigating agent prior to dispersing in the ointment base. Topical creams and lotions are prepared by dispersing the antibiotic in the oil phase prior to the emulsification of the oil phase in water.

For parenteral administration, fluid unit dosage forms are prepared utilizing the antibiotic and a sterile vehicle, water being preferred. The antibiotic, depending on the form and concentration used, can be either suspended or dissolved in the vehicle. In preparing solutions the water-soluble antibiotic can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the antibiotic is suspended in the vehicle instead of being dissolved and sterilization cannot be accomplished by filtration. The antibiotic can be sterilized by exposure to ethylene oxide before suspending in the sterile vehicle. Advantageously, a surfactant or wetting agent is included in the composition to facilitate uniform distribution of the antibiotic. For the treatment of animals by oral administration, the active ingredient is conveniently prepared in the form of a food premix. The food premix can comprise the active ingredient in admixture with an edible diluent such as starch, oatmeal, flour, calcium carbonate, talc, dried fish meal and like non-toxic, orally-acceptable diluents. The prepared premix is then added to the regular feed, thereby supplying the included medication to the animal in the course of feeding.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, troches, suppositories, powder packets, granules, wafers, cachets, teaspoonfuls, tablespoonfuls, dropperfuls, ampuls, vials, segregated multiples of any of the foregoing, and other forms as herein described.

The dosage of erythromycin ureide for treatment depends on route of administration; the age, weight, and condition of the patient; and the particular disease to be treated. For adults, a dosage schedule of from about 50 to 500 mg., 1 to 4 times daily (every six hours), embraces the effective range for the treatment of most conditions. For severe conditions, 4 gm. or more a day can be used in divided doses. For infants the dosage is calculated on the basis of 15 mg./kg., by weight, and for children 15 to 25 mg./kg., to be administered every six hours.

The erythromycin ureide is compounded with a suitable pharmaceutical carrier in unit dosage form for convenient and effective administration. In the preferred embodiments of this invention, the dosage units contain erythromycin ureide in 25, 50, 100, 200, and 500 mg. amounts for systemic treatment in 0.25, 0.5, 1 and 5% amounts for topical or localized treatment and 5 to 65% w./v. for parenteral preparations. The dosage of compositions containing erythromycin ureide and one or more other active ingredients is to be determined with reference to the usual dosage of each such ingredient. A dose of from about 1 mg./kg./day to about 60 mg./kg./day is preferred for systemic treatment.

The antibacterial activity of an invention compound compared with erythromycin is exemplified in the following table. This table shows the results of an in vivo antibacterial test. In this test the compounds were administered orally as aqueous solutions or suspensions to mice infected with *Streptococcus hemolyticus*. The results are expressed as $CD_{50}$ [median protective dose; Spearman-Karber, "Statistical Methods in Biological Assay," 2d. ed., pp. 524–530 (1964), Hafner Publishing Co., N.Y.].

IN VIVO ANTIBACTERIAL ACTIVITY

[Median protective dose ($CD_{50}$)]

| | Oral $CD_{50}$ | Ratio [1] |
|---|---|---|
| Erythromycin base | 18 (14–23) | |
| Erythromycin-2'-glutaryl-N-dicyclohexyl urea | 17 (12–23) | 0.94 |

[1] Ratio erythromycin base/urea.

This test demonstrates that, in addition to the markedly reduced bitter taste, the ureide compounds of this invention retain the antibacterial properties of erythromycin.

The following examples are illustrative of the process and products of the present invention, but are not to be construed as limiting. All percentages are by weight and all solvent mixture proportions are by volume unless otherwise noted.

EXAMPLE 1

Erythromycin-2'-glutaryl-N-dicyclohexyl urea

Erythromycin-2'-glutarate hemiester (12.72 gm., 0.015 mole), prepared as described in Example 6 of U.S. Pat. 2,957,864, is dissolved in 100 ml. of anhydrous acetone. Dicyclohexylcarbodiimide (3.75 gm., 0.018 mole), is dissolved in 75 ml. of anhydrous acetone. The two solutions are combined and stirred for three hours. The resulting mixture is filtered and the solvent removed in vacuo to a powder. This powder is pulverized and dried in vacuo at 40° C. for two hours to give an impure preparation of erythromycin-2'-glutaryl-N-dicyclohexyl urea. Six grams of this impure preparation is dissolved in 25 ml. of anhydrous acetone, the solution is filtered, and then placed on a column packed by acetone slurry with 427 gm. of silica gel (70–325 mesh).

The silica gel, prior to packing, is treated as follows: It is suspended in anhydrous acetone and the "fines" decanted. This procedure is repeated several times. The silica gel is then dried by vacuum filtration and washed five times with 200 ml. portions of chloroform. The silica gel is then dried on a vacuum filter prior to suspension in anhydrous acetone.

The above-mentioned packed column is eluted with anhydrous acetone at a rate of 12 ml. per minute, the tubes numbering 30 to 79 are collected and pooled. The solvent is removed at room temperature; yield 2.4 grams of pure erythromycin-2'-glutaryl-N-dicyclohexyl urea.

*Analysis.*—Calcd. for $C_{55}H_{95}N_3O_{16}$ (percent): C, 62.65; H, 9.08; N, 3.99; $H_2O$, 0. Found (percent): (Corrected for $H_2O$) C, 62.54; H, 8.55; N, 3.71; $H_2O$, 1.23.

EXAMPLE 2

Following the procedure of Example 1, but substituting didodecylcarbodiimide for dicyclohexylcarbodiimide, there is obtained erythromycin-2'-glutaryl-N-didodecyl urea.

EXAMPLE 3

Erythromycin-2'-glutaryl-N-dicylcolhexyl urea malate

Erythromycin-2'-glutaryl-N-dicyclohexyl urea (10.11 g., 0.01 mole) is dissolved in 50 ml. of ether. Malic acid (2.01 g., 0.015 mole) is dissolved in 75 ml. of ether. The solutions are mixed, shaken for 3 minutes, filtered, and the resulting precipitate of erythromycin-2'-glutaryl-N-dicyclohexyl urea maleate is air dried for 2 hours.

EXAMPLE 4

Erythromycin-2'-glutaryl-N-dicyclohexyl urea pamoate

Erythromycin-2'-glutaryl-N-dicyclohexyl urea malate (5. g., 0.0042 mole) is dissolved in 100 ml. of water and filtered. Sodium pamoate (1.30 g., 0.003 mole) is dissolved in 50 ml. of water and filtered. The solutions are mixed together and stirred for 5 minutes. The resulting yellow precipitate of erythromycin-2'-glutaryl-N-dicyclohexyl urea pamoate is filtered and air-dried for 2 hours.

EXAMPLE 5

Erythromycin-2'-glutaryl-N-dicyclohexyl urea lauryl sulfate

Erythromycin-2'-glutaryl-N-dicyclohexyl urea malate (11 g., 0.0093 mole) is dissolved in 150 ml. of water and filtered. Sodium lauryl sulfate (3.17 gm., 0.011 mole) is dissolved in 100 ml. of water and filtered. The solutions are combined and shaken for 1 minute. The resulting yellow gum is separated, dried, and pulverized to give erythromycin-2'-glutaryl-N-dicyclohexyl urea lauryl sulfate.

EXAMPLE 6

Erythromycin-2'-glutaryl-N-didoecyl urea malate

Erythromycin - 2' - glutaryl-N-didodecyl urea (2 g., 0.0017 mole) is dissolved in 50 ml. of ether. Malic acid 0.27 g., 0.002 mole) is dissolved in 50 ml. of ether. The solutions are combined and shaken. The precipitate of erythromycin-2'-glutaryl-N-didodecyl urea malate is filtered and air-dried.

EXAMPLE 7

Erythromycin-2'-glutaryl-N-didodecyl urea pamoate

Erythromycin - 2' - glutaryl-N-didodecyl urea malate (1.15 g., 0.00086 mole) is dissolved in 100 ml. of water. Sodium pamoate (0.28 g., 0.00065 mole) is dissolved in 100 ml. of water. The solutions are each filtered and combined. The resulting precipitate of erythromycin-2'-glutaryl-N-didodecyl urea pamoate is filtered and air-dried.

EXAMPLE 8

Erythromycin-2'-glutaryl-N-didodecyl urea lauryl sulfate

Erythromycin-2' - glutaryl - N - didodecyl urea malate (1.15 g., 0.00086 mole) is dissolved in 100 ml. of water. Sodium lauryl sulfate (0.288 g., 0.0001 mole) is also dissolved in 100 ml. of water. The solutions are filtered and combined with stirring. The resulting precipitate of erythromycin-2'-glutaryl-N-didodecyl urea lauryl sulfate is filtered and air-dried.

EXAMPLE 9

Capsules

One thousand two-piece hard gelatin capsules for oral use, each containing 250 mg. of erythromycin-2'-glutaryl-N-dicyclohexyl urea are prepared from the following types and amounts of materials:

| | Gm. |
|---|---|
| Erythromycin-2'-glutary-N-dicyclohexyl urea | 250 |
| Corn starch | 150 |
| Talc | 75 |
| Magnesium stearate | 25 |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared containing the antibiotic in 50, 100, and 500 mg. amounts by substituting 50, 100 and 500 g. of antibiotic for the 250 g. used above.

EXAMPLE 10

Tablets

One thousand tablets for oral use, each containing 500 mg. of erythromycin-2'-glutaryl-N-dicyclohexyl urea are prepared from the following types and amounts of materials:

| | Gm. |
|---|---|
| Erythromycin-2'-glutaryl-N-dicyclohexyl urea | 500 |
| Lactose | 125 |
| Corn starch | 65 |
| Magnesium stearate | 25 |
| Light liquid petrolatum | 3 |

The ingredients are thoroughly mixed and slugged. The slugs are broken down by forcing through a number sixteen screen. The resulting granules are then compressed into tablets, each tablet containing 500 mg. of antibiotic.

The foregoing tablets are useful for systemic treatment of infections in adult humans by oral administration of 1 tablet every 4 hours.

Using the above procedure, except for reducing the amount of antibiotic to 200 g., tablets containing 200 mg. of antibiotic are prepared.

EXAMPLE 11

Tablets

One thousand oral tablets, each containing 125 mg. of erythromycin-2'-glutary-N-dicyclohexyl urea and a total of 250 mg. (83.3 mg. each) of sulfadiazine, sulfamerazine, and sulfamethazine, are prepared from the following types and amounts of materials:

| | Gm. |
|---|---|
| Erythromycin-2'-glutaryl-N-dicyclohexyl urea | 125 |
| Sulfadiazine | 83.3 |
| Sulfamerazine | 83.3 |
| Sulfamethazine | 83.3 |
| Lactose | 50 |
| Corn starch | 50 |
| Calcium stearate | 25 |
| Light liquid petrolatum | 5 |

The ingredients are thoroughly mixed and slugged. The slugs are broken down by forcing through a number sixteen screen. The resulting granules are then compressed into tablets, each containing 100 mg. of antibiotic and a total of 250 mg. (83.3 mg. each) of sulfadiazine, sulfamerazine, and sulfamethazine.

The foregoing tablets are useful for systemic treatment of infections by the oral administration of 4 tablets first and then 1 every six hours.

For the treatment of urinary infections, the triple sulfas in the above formulation is advantageously replaced by 250 g. of sulfamethylthiadiazole or 250 g. of sulfacetamide.

EXAMPLE 12

Granules 2367 g. of a granulation suitable for reconstitution with water prior to use is prepared from the following types and amounts of ingredients:

| | Gm. |
|---|---|
| Erythromycin-2'-glutaryl-N-didodecyl urea | 150 |
| Sucrose, powdered | 2155 |
| Flavor | 60 |
| Sodium metabisulfite | 2 |

The erythromycin ureide, sugar, flavor, and sodium metabisulfite are mixed together until thoroughly blended. The powder mixture is wetted with water and forced through a screen to form granules. The granules are dried and 23.67 g. filled into 60 cc. bottles. Prior to use sufficient water is added to the granules to make 60 cc. of composition.

The foregoing composition is useful for systemic treatment of infection, particularly in children at a dose of one teaspoonful (5 cc.) 4 times daily.

EXAMPLE 13

Oral syrup 1000 cc. of an aqueous preparation for oral use, containing in each 5 cc. dose, 250 mg. of erythromcyin-2'- glutaryl-N-didodecyl urea is prepared from the following types and amounts of ingredients:

| | Gm. |
|---|---|
| Erythromycin-2'-glutaryl - N - didodecyl urea lactobionate | 50 |
| Citric acid | 2 |
| Benzoic acid | 1 |
| Sucrose | 700 |
| Tragacanth | 5 |
| Lemon oil | 2 |
| Deionized water q.s., 1000 cc. | |

The citric acid, benzoic acid, sucrose, tragacanth, and lemon oil are dispersed in sufficient water to make 850 cc. of solution. The antibiotic is stirred into the syrup until uniformly distributed. Sufficient water is added to make 1000 cc.

The composition so prepared is useful in the systemic treatment of infection due to *Klebsiella pneumoniae* in adult humans at a dose of 1 or 2 teaspoonfuls 4 times a day.

EXAMPLE 14

Parenetral suspension

A sterile aqueous suspension for intramuscular use, containing in 1 cc. 200 mg. of erythromycin-2'-glutaryl-N-dicyclohexyl urea is prepared from the following types and amounts of materials:

| | Gm. |
|---|---|
| Erythromycin-2'-glutaryl-N-dicyclohexyl urea | 200 |
| Lidocaine hydrochloride | 4 |
| Methylparaben | 2.5 |
| Propylparaben | 0.17 |
| Water for injection q.s. | 1000 |

All of the ingredients, except the antibiotic, are dissolved in the water and the solution sterilized by filtration. To the sterile solution is added the sterilized antibiotic and the final suspension is filled into sterile vials and the vials sealed.

EXAMPLE 15

Parenteral solution

A sterile aqueous solution for intramuscular use, containing in 1 cc., 150 mg. of erythromycin-2'-glutaryl-N-dicyclohexyl urea hydrochloride, is prepared from the following types and amounts of ingredients:

| | Gm. |
|---|---|
| Erythromycin-2'-glutaryl-N-dicyclohexyl urea hydrochloride | 150 |
| Lactose | 50 |
| Water for injection q.s., 1000 cc. | |

The antibiotic and lactose are dissolved in the water and the solution sterilized by filtration. The sterile solution in the amount of 2 cc., is aseptically filled into sterile vials and frozen. The water is removed under high vacuum and the vials containing the lyophilized powder are sealed. Just prior to use, sufficient water for injection to make 2 cc. of solution is added to the vial.

EXAMPLE 16

Topical ointment 1000 g. of 2% ointment is prepared from the following types and amounts of ingredients:

| | Gm. |
|---|---|
| Erythromycin-2'-glutaryl-N-dicyclohexyl urea | 20 |
| Zinc oxide | 50 |
| Calamine | 50 |
| Liquid petrolatum (heavy) | 250 |
| Wool fat | 200 |
| White petrolatum q.s. | 1000 |

The white petrolatum and wool fat are melted and 100 g. of liquid petrolatum added thereto. The antibiotic, zinc oxide and calamine are added to the remaining liquid petrolatum and the mixture milled until the powders are finely divided and uniformly dispersed. The powder mixture is stirred into the whole petrolatum mixture and stirring continued until the ointment congeals.

The foregoing ointment is usefully applied topically to the skin of mammals for the treatment of infection.

The foregoing composition can be prepared by omitting the zinc oxide and calamine.

Following the procedure above, ointments are similarly prepared containing erythromycin ureides in 0.5, 1.0, and 5% amounts by substituting 5, 10, and 50 g. of antibiotic for the 20 g. used above.

EXAMPLE 17

Troches 10,000 troches are prepared from the following types and amounts of ingredients:

| | Gm. |
|---|---|
| Erythromycin-2'-glutaryl-N-didodecyl urea | 100 |
| Neomycin sulfate | 50 |
| Ethyl aminobenzoate | 50 |
| Polymyxin B sulfate (10,000 units/mg.) | 1 |
| Calcium stearate | 150 |
| Powdered sucrose q.s. | 5000 |

The powdered materials are mixed thoroughly and then compressed into half gram troches following the usual techniques for the preparation of compressed tablets.

The troches are held in the mouth and allowed to dissolve slowly to provide treatment for the mouth and throat of humans.

EXAMPLE 18

Mastitis ointment 1000 g. of an ointment for the treatment of mastitis in diary cattle is prepared from the following types and amounts of ingredients:

| | Gm. |
|---|---|
| Erythromycin - 2' - gluatryl - N - dicyclohexyl urea sulfate | 50 |
| Prednisolone acetate | 0.5 |
| Light liquid petrolatum | 300 |
| Chlorobutanol, anhydrous | 5 |
| Polysorbate 80 | 5 |
| 2% Aluminum monostearate-peanut oil gel | 400 |
| White petrolatum q.s. | 1000 |

The antibiotic and prednisolone acetate are milled with the light liquid petroleum until finely divided and uniformly dispersed. The chlorobutanol, polysorbate 80, peanut oil gel and white petrolatum are heated to 120° F. to form a melt and the liquid petrolatum dispersion stirred in. With continued stirring the dispersion is allowed to cool (and congeal) to room temperature and is filled into disposable mastitis syringes in 10 g. doses.

EXAMPLE 19

Animal feed 1000 g. of a feed mix is prepared from the following types and amounts of ingredients:

| | Gm. |
|---|---|
| Erythromycin-2'-glutaryl-N-dicyclohexyl urea | 10 |
| Soybean meal | 400 |
| Fish meal | 400 |
| Wheat germ oil | 50 |
| Sorghum molasses | 140 |

The ingredients are mixed together and pressed into pellets.

The composition can be fed to laboratory animals, i.e., rats, mice, guinea pigs, and rabbits for prophylaxis during shipping.

For larger animals the composition can be added to the animal's regular feed in an amount calculated to give the desired dose of antibiotic.

EXAMPLE 20

Following the procedure of each of the preceding Examples 9 through 19, each member selected from the group consisting of erythromycin-2'-glutaryl-N-dicyclohexyl urea malate,
erythromycin-2'-glutaryl-N-dicyclohexyl urea pamoate,
erythromycin-2'-glutaryl-N-dicyclohexyl urea lauryl sulfate,
erythromycin-2'-glutaryl-N-didodecyl urea malate,
erythromycin-2'-glutaryl-N-didodecyl urea pamoate, and
erythromycin-2'-glutaryl-N-didodecyl urea lauryl sulfate is substituted in an equivalent amount for the particular form of erythromycin ureide shown in the example to provide similar therapeutic properties.

I claim:

1. Erythromycin ureides of the formula:

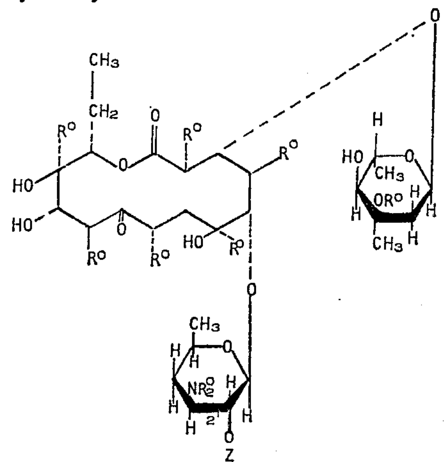

wherein

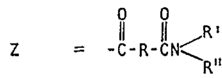

$R° = CH_3$

R=the radical obtained by the removal of the two carboxyl groups from a dicarboxylic acid which can be dehydrated to an inner anhydride

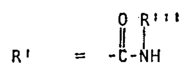

R'' and R'''=H, alkyl of from 1 to 20 carbon atoms, inclusive, and isomeric forms thereof, cycloalkyl of 3 to 8 carbon atoms, inclusive, and aralkyl of not more than 12 carbon atoms;

and acid addition salts thereof.

2. Erythromycin-2'-glutaryl-N-dicyclohexyl urea, a compound according to claim 1.

3. A process for preparing an erythromycin ureide, a compound as defined in claim 1, which comprises:

(a) reacting erythromycin with an anhydride of a dibasic carboxylic acid to produce an erythromycin hemiester, and, (b) reacting said erythromycin hemiester with a substituted diimide of the formula:

R—N=C=N—R' wherein R and R' are hydrogen, alkyl of from 1 to 20 carbon atoms, inclusive, and isomeric forms thereof, cycloalkyl of from 3 to 8 carbon atoms, inclusive, and aralkyl of not more than 12 carbon atoms.

4. A process, according to claim 3, which comprises:

(a) reacting erythromycin with glutaric anhydride to form erythromycin-2'-glutarate hemiester, and (b) reacting erythromycin-2'-glutarate hemiester with dicyclohexylcarbodiimide to form erythromycin-2'-glutaryl-N-dicyclohexyl urea.

5. A process for preparing erythromycin ureide, a compound as defined in claim 1, which comprises reacting erythromycin hemiester with a substituted diimide of the formula:

R—N=C=N—R' wherein R and R' are hydrogen, alkyl of from 1 to 20 carbon atoms, inclusive, and isomeric forms thereof, cycloalkyl of from 3 to 8 carbon atoms, inclusive, and aralkyl of not more than 12 carbon atoms.

6. A process for preparing erythromycin ureide, according to claim 5, which comprises reacting erythromycin-2'-glutarate hemiester with dicyclohexylcarbodiimide to form erythromycin-2'-glutaryl-N-dicyclohexyl urea.

References Cited

UNITED STATES PATENTS 2,857,312 10/1958 Stephens ---------- 260—210 E
2,957,864 10/1960 Murray ----------- 260—210 E LEWIS GOTTS, Primary Examiner J. R. BROWN, Assistant Examiner U.S. Cl. X.R.

424—181